US008082358B2

United States Patent
Wang et al.

(10) Patent No.: US 8,082,358 B2
(45) Date of Patent: Dec. 20, 2011

(54) ISP-FRIENDLY RATE ALLOCATION FOR P2P APPLICATIONS

(75) Inventors: Jiajun Wang, Oakland, CA (US);
Cheng Huang, Redmond, WA (US);
Sudipta Sengupta, Redmond, WA (US);
Jin Li, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 162 days.

(21) Appl. No.: 12/242,913

(22) Filed: Sep. 30, 2008

(65) Prior Publication Data
US 2010/0082838 A1 Apr. 1, 2010

(51) Int. Cl.
*G06F 15/16* (2006.01)
(52) U.S. Cl. .......................... 709/232; 709/233
(58) Field of Classification Search .................. 709/232, 709/233, 234
See application file for complete search history.

(56) References Cited

U.S. PATENT DOCUMENTS

| | | | |
|---|---|---|---|
| 6,408,005 B1* | 6/2002 | Fan et al. ...................... | 370/412 |
| 7,155,723 B2 | 12/2006 | Swildens et al. | |
| 7,292,602 B1 | 11/2007 | Liu et al. | |
| 2003/0002484 A1* | 1/2003 | Freedman ...................... | 370/352 |
| 2003/0110154 A1 | 6/2003 | Ishihara | |
| 2006/0026004 A1 | 2/2006 | Van Nieuwenhuizen | |
| 2006/0053209 A1* | 3/2006 | Li ................................ | 709/217 |
| 2006/0130107 A1 | 6/2006 | Gonder | |
| 2006/0190615 A1* | 8/2006 | Panwar et al. ................. | 709/231 |
| 2006/0268711 A1 | 11/2006 | Doradla | |
| 2007/0005792 A1 | 1/2007 | Collet | |
| 2007/0261004 A1 | 11/2007 | Swildens | |
| 2008/0133538 A1* | 6/2008 | Chavez et al. .................. | 707/10 |
| 2008/0307107 A1* | 12/2008 | Chen et al. ..................... | 709/231 |

FOREIGN PATENT DOCUMENTS

| | | |
|---|---|---|
| WO | WO03010329 A1 | 12/2003 |
| WO | WO2006027557 A1 | 3/2006 |

OTHER PUBLICATIONS

Bindal, R., P. Cao, W. Chan, J. Medved, G. Suwala, T. Bate, A. Zhang, Improving traffic locality in BitTorrent via biased neighbor selection, 26th IEEE Int'l Conf. on Distributed Computing Systems, Jul. 2006, pp. 66-76.
Gao, L., On inferring autonomous system relationships in the internet, IEEE/ACM Transactions on Networking, Dec. 2001, vol. 9, No. 6.

(Continued)

*Primary Examiner* — Philip Chea
(74) *Attorney, Agent, or Firm* — Lyon & Harr, L.L.P.; Craig S. Fischer

(57) ABSTRACT

An ISP-friendly rate allocation system and method that reduces network traffic across ISP boundaries in a peer-to-peer (P2P) network. Embodiments of the system and method continuously solve a global optimization problem and dictate accordingly how much bandwidth is allocated on each connection. Embodiments of the system and method minimize load on a server in communication with the P2P network, minimize ISP-unfriendly traffic while keeping the minimum server load unaffected, and maximize peer prefetching. Two different techniques are used to compute rate allocation, including a utility function optimization technique and a minimum cost flow formulation technique. The utility function optimization technique constructs a utility function and optimizes that utility function. The minimum cost flow formulation technique generates a minimum cost flow formulation using a bipartite graph have a vertices set and an edges set. A distributed minimum cost flow formulation is solved using Lagrangian multipliers.

19 Claims, 9 Drawing Sheets

OTHER PUBLICATIONS

Griwodz, C., The Use of Stream Merging Mechanisms in a Hierarchical CDN, Multimedia Computing and Networking, Dec. 2003, p. 1-15.

Gummadi, K. P., R. J. Dunn, S. Saroiu, S. D. Gribble, H. M. Levy, and J. Zahorjan, Measurement, modeling, and analysis of a peer-to-peer file-sharing workload, Proc. of the 19th ACM Symposium on Operating Systems Principles, Oct. 2003.

Guo, H, K. T. Lo, J. Li, An efficient caching scheme for on-demand streaming service on overlay networks, 4th IEEE Consumer Communications and Networking Conf., Jan. 2007, pp. 322-326.

Han, H., S. Shakkottai, C. V. Hollot, R. Srikant, D. Towsley, Multipath TCP: A joint congestion control and routing scheme to exploit path diversity in the internet, IEEE/ACM Transactions on Networking, Dec. 2006, vol. 14, No. 6, IEEE Press Piscataway, NJ, USA.

Huang, C., J. Li, and K. W. Ross, Can internet video-on-demand be profitable?, Proc. ACM SIGCOMM, Kyoto, Japan, Aug. 2007, pp. 133-144.

Janakiraman, R., M. Waldvogel, W. Deng and L. Xu, Achieving scalable and efficient video-on-demand over multicast, IBM Research Report RZ-3495, Dec. 2002.

Karagiannis, T., P. Rodriguez, D. Papagiannaki, Should internet service providers fear peer-assisted content distribution?, Proc. of the 5th Conf. on Internet Measurement, Oct. 2005, pp. 63-76.

Kelly, F. P., A. K. Maulloo, D. K. H. Tan, Rate control for communication networks: Shadow prices, proportional fairness and stability, The Journal of the Operational Research Society, Mar. 1998, pp. 237-252, vol. 49, No. 3.

Li, J., Locality aware peer assisted delivery: The way to scale internet video to the world, Communication and Collaboration Systems, Packet Video, Nov. 2007, pp. 133-142.

Lun, D. S., N. Ratnakar, R. Koetter, M. Médard, E. Ahmed, H. Lee, Achieving minimum-cost multicast: A decentralized approach based on network coding, Proc. INFOCOM, Mar. 2005, pp. 1607-1617, vol. 3.

Qiu, D., R. Srikant, Modeling and performance analysis of BitTorrent-like peer-to-peer networks, Proc. of the 2004 Conf. on Applications, Technologies, Architectures, and Protocols for Comp. Comm, Oct. 2004, vol. 34, No. 4, ACM New York, NY, USA.

Saroiu, S., K. P. Gummadi, R. J. Dunn, S. D. Gribble, H. M. Levy, An analysis of internet content delivery systems, Proc. of 5th Symposium on Operating Systems Design and Implementation, Dec. 2002, pp. 315-328, Boston, MA, USA.

Spring, N., R. Mahajan, D. Wetherall, T. Anderson, Measuring ISP topologies with Rocketfuel, IEEE/ACM Transactions on Networking, Feb. 2004, pp. 2-16, vol. 12, No. 1.

Tokekar, V., A. K. Ramani, S. Tokekar, Performance studies of networked video-on-demand systems, Proc. of the 14th Int'l Conf. on Comp. Comm. and Networks, Oct. 2005, pp. 387-392.

Wei, D. X., C. Jin, S. H. Low, S. Hegde, Fast TCP: Motivation, architecture, algorithms, performance, IEEE/ACM Transactions on Networking, Dec. 2006, pp. 1246-1259, vol. 1, No. 6.

Wu, C., B. Li, S. Zhao, Magellan: Charting large-scale peer-to-peer live streaming topologies, 27th Int'l. Conf. on Distributed Computing Systems, Jun. 2007, pp. 62-69.

Wu, C., B. Li, On meeting P2P streaming bandwidth demand with limited supplies, Proc. of the Fifteenth Annual SPIE/ACM Int'l Conf. on Multimedia Computing and Networking, Jan. 2008, San Jose, California.

Wu, C., B. Li, Strategies of conflict in coexisting streaming overlays, 26th IEEE Intl Conf. on Comp. Comm., May 2007, pp. 481-489.

Xie, H., Y. R. Yang, A. Krishnamurthy, Y. G. Liu, A. Silberschatz, P4P: Provider portal for applications, Proc. ACM SIGCOMM, Aug. 2008, ACM New York, NY, USA.

* cited by examiner

ISP-FRIENDLY RATE ALLOCATION FOR P2P APPLICATIONS

BACKGROUND

Content distribution over the Internet is rapidly increasing. One area of considerable growth is video-on-demand over the Internet. However, providing high-quality Internet video-on-demand with a traditional client-server model is very costly. More importantly, the ever-mounting demand is adding significant pressure onto existing server-based infrastructures (such as data centers, content distribution networks (CDNs)), which are already under heavy burden to live up to their current load. As a result, high-profile failures are not uncommon.

Fortunately, on the heel of such crisis, peer-to-peer (P2P) networks come to rescue. Indeed, Internet video streaming (both on-demand and live broadcast) using various peer-to-peer or peer-assisted frameworks has been shown to greatly reduce the dependence on infrastructure servers, as well as bypass bottlenecks between content providers and consumers. Content distribution using a P2P network greatly reduces dependence on infrastructure servers and scales up to the demand of the Internet video era. However, it has also fundamentally altered the relationship among content owners, Internet service providers (ISPs), and consumers. In particular, ISPs on one hand are spending billions to maintain and upgrade their networks in order to support the ever increasing traffic due largely to P2P. On the other hand, ISPs are also being marginalized by content owners' direct reaching to consumers. As a result, unhappy ISPs started to put up various hurdles for P2P applications (such as throttling P2P traffic or even taking active measures to deter P2P traffic). These practices, however, created a huge backlash once they were discovered and made public. ISPs now realize that it is in their best interest to work collaboratively with content providers and consumers. However, to provide to ISPs to embrace P2P networks, any solution has to include a way for P2P applications to become ISP-friendly at the protocol level.

In general, ISP-unfriendly traffic refers to all levels of traffic unfriendly to ISPS. It includes traffic crossing ISP boundaries, between post-office protocols (PoPs), or even among different neighborhoods within the same ISP and PoP. Crossing ISP boundary traffic is a particularly significant concern of all the ISP-unfriendly traffic. ISP-unfriendly traffic is detrimental to ISPs because it increases an ISP's cost of doing business. This increase in the cost of doing business for the ISP is passed on to the user in the form of higher prices to access the Internet. This makes users unhappy. Thus, it is a double-edged sword for the ISP, who wants to keep prices low to attract customers but faces users wanting to exchange content using P2P content distribution.

At least two broad types of techniques have been used in an attempt to make P2P application more ISP-friendly. The aim of these techniques is to ensure quality of service (QoS) to an end user, to try and use as much of the P2P resources as possible, and to minimize adverse impact to the ISP.

One type of technique addresses the network topology of the P2P network. These topology-based techniques include biased neighbor selection and can be extended to take into account multi-tier network topology, from subnets, POPs, to ISPs. The topology building mechanism can also be implicit. Another type of techniques uses rate allocation to improve ISP-friendliness. Current rate allocation techniques apply a distributed optimization framework to P2P networks. However, each of these rate allocation techniques focuses on either application layer multicast or P2P live streaming.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the ISP-friendly rate allocation system and method that reduces network traffic across ISP boundaries. This is called "ISP-friendly." Instead of working on network topology, embodiments of the ISP-friendly rate allocation system and method use rate allocation to reduce traffic across ISP boundaries. Embodiments of the ISP-friendly rate allocation system and method assume the topology of the P2P network is fixed. Embodiments of the ISP-friendly rate allocation system and method operate at the packet level. Moreover, embodiments of the ISP-friendly rate allocation system and method reduce ISP-unfriendly traffic in a P2P network. In this manner, embodiments of the ISP-friendly rate allocation system and method guarantee quality of service to an end user, use as much of the P2P network as possible, and minimize adverse impact to an ISP.

In general, embodiments of the ISP-friendly rate allocation system and method continuously solve a global optimization problem and dictate accordingly how much bandwidth is allocated on each connection. Embodiments of the ISP-friendly rate allocation system and method operate at the protocol level. Embodiments of the system and method formulate an optimization problem for rate allocation that guarantees quality of service (QoS) for consumers, reduces server, load for content owners, and reduces ISP-unfriendly traffic. Moreover, embodiments of the system and method derive a distributed solution that can be executed by each P2P client independently, while collectively achieving the desired global optimal rate allocation.

Embodiments of the ISP-friendly rate allocation system and method include three hierarchical aims. The first aim is to minimize load on a server in communication with the P2P network. This is a first-order aim. The second aim is to minimize ISP-unfriendly traffic. There are many possible rate allocations that can result in the same minimum server load. Thus, the second-order aim is to minimize ISP-unfriendly traffic, while keeping the minimum server load unaffected. A third aim is to maximize peer prefetching. When both of the above aims are met, it is possible that peers still have spare upload bandwidth. This upload bandwidth is utilized to allow peers to download faster than real-time and cache future content. Prefetching can reduce server load as well as ISP-unfriendly traffic. Hence, the third-order aim is to maximize peer prefetching while leaving the first two aims unaffected.

Embodiments of the ISP-friendly rate allocation system and method can use two different techniques to compute rate allocation. A first technique is a utility function optimization technique. This technique constructs a utility function and then optimizes that utility function using a steepest descent technique. At each step the rate allocation is updated by using an update equation that guarantees convergence. Moreover, a modified utility function is generated from an original utility function by connecting two linear components of the original utility function with a concave smooth curve. The results of the utility function optimization technique yield an optimal rate allocation.

A second technique is a minimum cost flow formulation technique. This technique formulates a linear program formulation and then reformulates it as a minimum cost flow formulation. This reformulation can be done using a bipartite graph have a vertices set and an edges set. The minimum cost flow formulation is rewritten as a distributed minimum cost flow formulation. This distributed minimum cost flow formulation is updated using a rate allocation update equation. Moreover, the distributed minimum cost flow formulation is solved using Lagrangian multipliers that have the supply node Lagrangian multipliers and the demand node Lagrangian multipliers updated regularly. In addition, any surplus upload bandwidth is allocated using a convex program formulation.

Embodiments of the ISP-friendly rate allocation system and method also include a packet-level scheduling technique implement one of the two above rate allocation techniques in a P2P environment. The packet-level scheduling technique uses a token scheme to determine which neighbor peer's request to satisfy first. Specifically, the packet-level scheduling technique defines a rate allocation interval and a token allocation interval. The optimal rate allocation is updated at each rate allocation interval using an update equation. Moreover, at each token allocation interval, the peer is supplied with a number of tokens to give out. The number of tokens is proportional to the peer's upload bandwidth. At least some of the supplied tokens are allocated to a neighbor peer using the update equation.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of the ISP-friendly rate allocation system and method reference is made to the accompanying drawings, which form a part thereof, and in which is shown by way of illustration a specific example whereby embodiments of the ISP-friendly rate allocation system and method may be practiced. It is to be understood that other embodiments may be utilized and structural changes may be made without departing from the scope of the claimed subject matter.

I. System Overview

Figure 1:
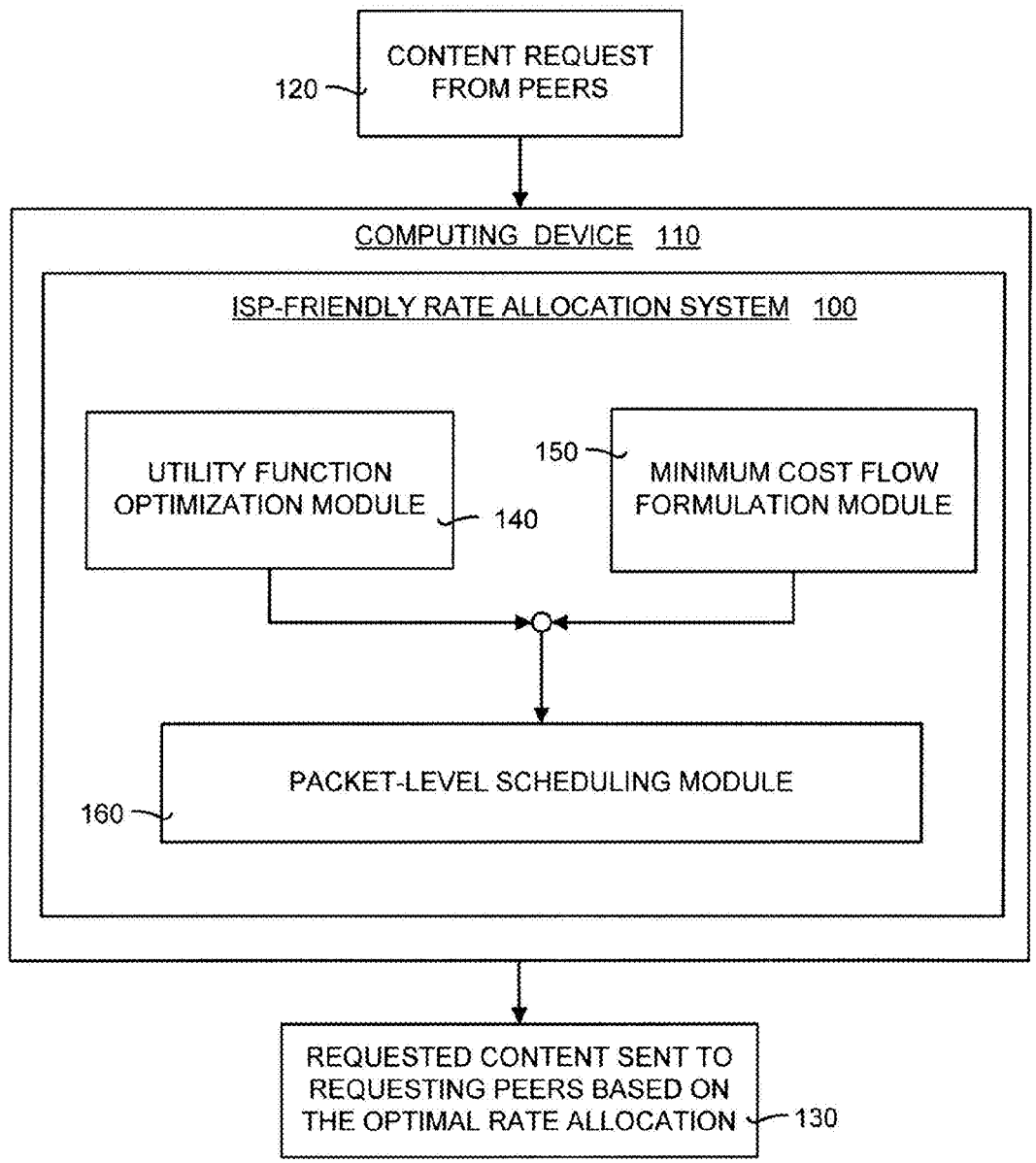
FIG. 1 is a block diagram illustrating a general overview of embodiments of the ISP-friendly rate allocation system and method disclosed herein.

FIG. 1 is a block diagram illustrating a general overview of embodiments of the ISP-friendly rate allocation system and method disclosed herein. It should be noted that the implementation shown in FIG. 1 is only one of many implementations that are possible. Referring to FIG. 1, an ISP-friendly rate allocation system 100 is shown implemented on a computing device 110. It should be noted that the computing device 110 may include a single processor (such as a desktop or laptop computer) or several processors and computers connected to each other.

In general, ISP-friendly rate allocation system 100 receives a request for content from its peers in the P2P network 120, processes the request and determines an optimal rate allocation, and then outputs the requested content that is sent to the requesting peers based on the optimal rate allocation 130. It should be noted that this optimal rate may change at any given time. Therefore, the ISP-friendly rate allocation system 100 is constantly updating the optimal rate allocation.

The ISP-friendly rate allocation system 100 can determine the optimal rate allocation using at least two different techniques. These techniques include a utility optimization technique and a minimum cost flow formulation technique. The ISP-friendly rate allocation system 100 includes a utility function optimization module 140 that computes the optimal rate allocation using the utility function optimization technique. The ISP-friendly rate allocation system 100 also includes a minimum cost flow formulation module 150 that computes the optimal rate allocation using the minimum cost flow formulation technique. The ISP-friendly rate allocation system 100 also includes a packet-level scheduling module 160 for implementing the optimal rate allocation at a packet level to fill requests for content from neighboring peers.

Figure 2:
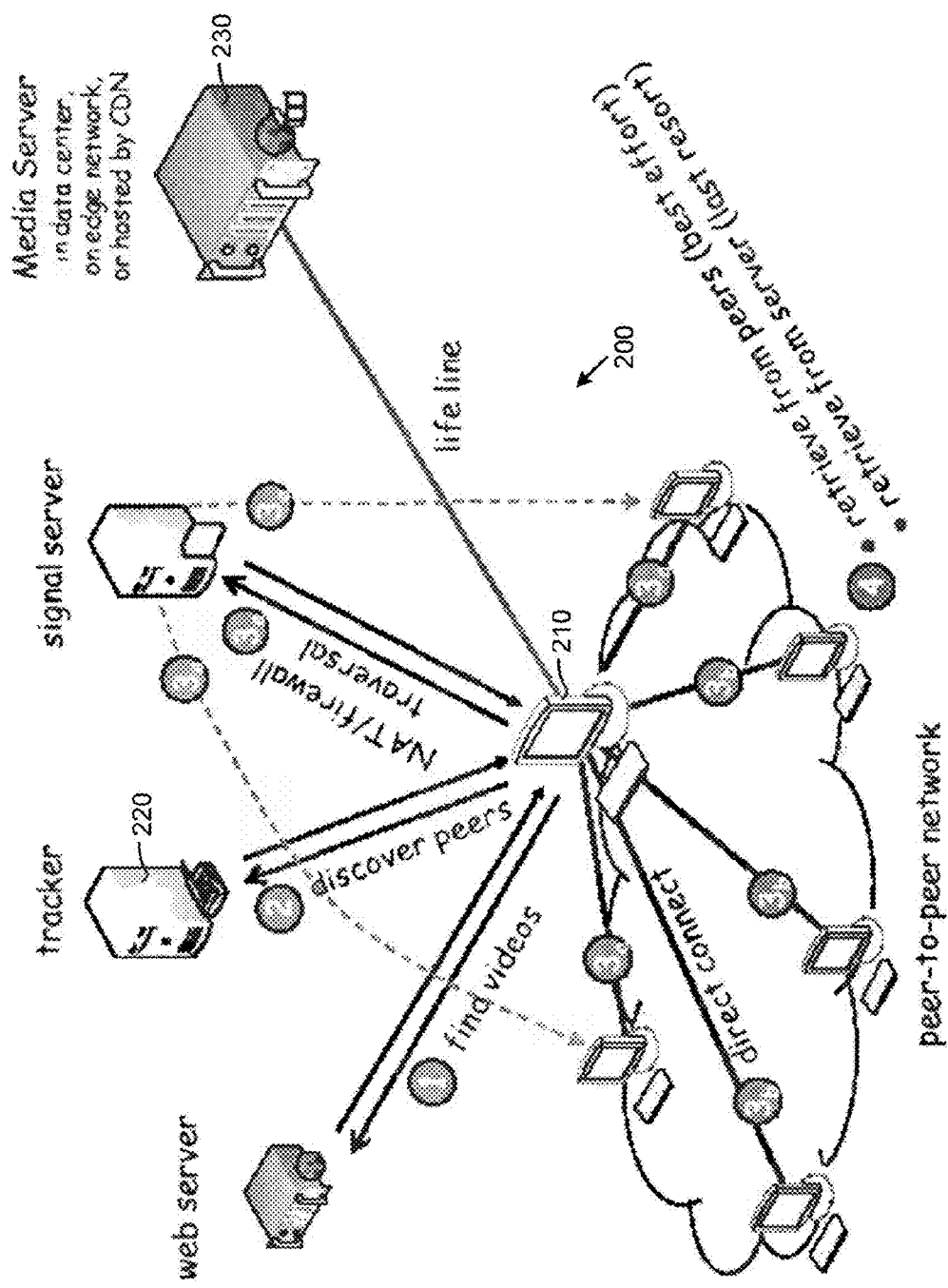
FIG. 2 is a block diagram illustrating details of an exemplary embodiment of the ISP-friendly rate allocation system and method shown in FIG. 1 implemented in a peer-to-peer networking environment.

FIG. 2 is a block diagram illustrating details of an exemplary embodiment of the ISP-friendly rate allocation system 100 and method shown in FIG. 1 implemented in a peer-to-peer networking environment. In FIG. 2, a peer-assisted distribution platform 200 is shown that supports both video-on-demand (VoD) as well as bulk data dissemination. FIG. 2 illustrates the flow of the peer-assisted VoD scenario.

Referring to FIG. 2, a client 210 discovers videos via a web interface to the content library (step 1). Special URLs with embedded information redirect the client to a directory service (or tracker 220). The client 210 downloads video metadata from the tracker 220 and also obtains a list of peers who have started watching the same video earlier and are available for sharing (step 2). The client 210 then establishes direct connections with these peers whenever possible (step 3b) or gets help from signal servers if network address translation (NAT)-traversal is required (step 3a).

In the implementation shown in FIG. 2, the client 210 retrieves content from its peers in a best effort fashion. Often, however, this cannot provide sufficient quality of service (QoS), such as a continuous high bitrate for high definition and smooth video playback). Hence, the client 210 actively monitors its QoS and adaptively retrieves content from media servers 230 as needed (life line in step 4). Such media servers 230 are located in data centers, on edge networks, or hosted by content distribution networks.

In implementation shown in FIG. 2, the tracker 220 generates the peer list based on certain criteria. In general, peers within the same autonomous system (AS) with peering relationships with the client's origin AS are favored. Note that an AS is a subnetwork under separate administrative control having a common routing policy to the Internet. This criterion helps to build an ISP-friendly topology. Additionally, peers started in closer time stamps (compared to the client's 210 own start time) are favored, This is because matching peers in such a manner helps increase upload efficiency.

II. Operational Overview

In a peer-to-peer system, be it streaming or file sharing, each peer connects to multiple other peers (its neighbor peers) simultaneously. The peer downloads and uploads content data to its neighbor peers. Compared to download capacity, a peer's upload capacity is limited and frequently is the most prominent constraint of such systems. This is because most peers are connected via DSL and cable modem (even FiOS hosts have very asymmetric access). When multiple connections to neighbors contend for the limited upload capacity (say via TCP congestion control), each connection gets a fair share of the total capacity. Assuming the round-trip time (RTT) to neighbor peers is similar, the natural contention will then result in an implicit rate allocation. This means that upload capacity is evenly divided among connections (which could be called even bandwidth allocation).

Even bandwidth allocation, however, often is not sufficient. In order to overcome this limitation, embodiments of the ISP-friendly rate allocation system 100 and method continuously solve a global optimization problem and dictate accordingly how much bandwidth is allocated on each connection. It can be shown that explicit rate allocation does significantly outperform even bandwidth allocation across various scenarios.

There are at least three aims of embodiments of the ISP-friendly rate allocation system 100 and method. First, embodiments of the ISP-friendly rate allocation system 100 and method seek to minimize server load. This is a first-order and primary aim. Second, embodiments of the ISP-friendly rate allocation system 100 and method seek to minimize ISP-unfriendly traffic. There are many possible rate allocations, which could all result in the same minimum server load. Hence, the second-order aim is to minimize ISP-unfriendly traffic while keeping the minimum server load unaffected. Finally, embodiments of the ISP-friendly rate allocation system 100 and method seek to maximize peer prefetching. When both the first and second aims have been met, then it is possible that peers still have spare upload bandwidth. This is especially true in a surplus mode. Such upload bandwidth is utilized to allow peers download faster than real-time and cache future content. This feature, called "prefetching," greatly reduces server load as well as ISP-unfriendly traffic. Hence, the third-order aim is to maximize peer prefetching while not affecting the first two aims.

Figure 3:
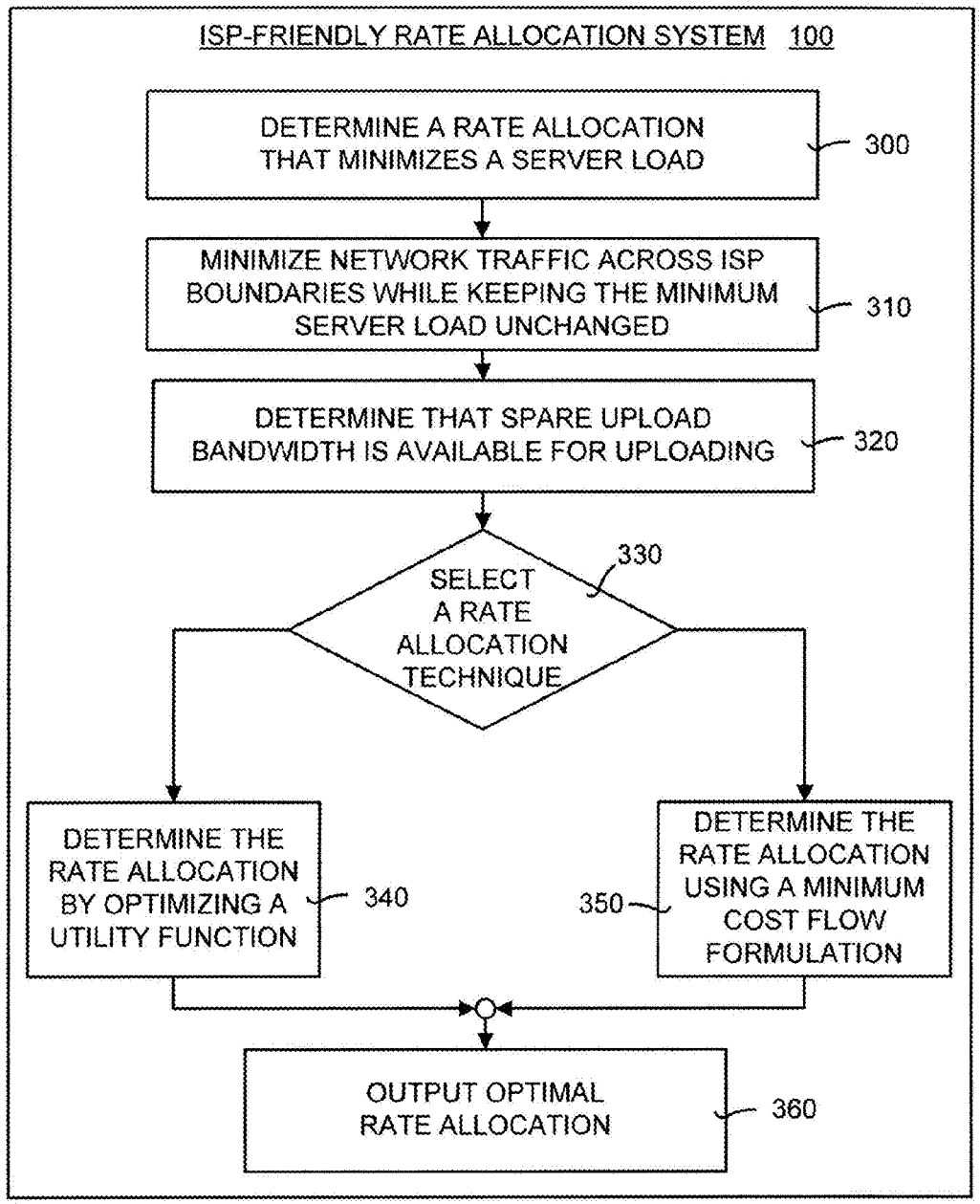
FIG. 3 is a flow diagram illustrating the operation of embodiments of the ISP-friendly rate allocation method of the ISP-friendly rate allocation system shown in FIG. 1.

FIG. 3 is a flow diagram illustrating the operation of embodiments of the ISP-friendly rate allocation method of the ISP-friendly rate allocation system 100 shown in FIG. 1. As outlined above, the method begins determining a rate allocation that will minimize a load on a server (box 300). Next, the method minimizes network traffic across ISP boundaries while keeping the minimum server load unchanged (box 310).

The method then determines that spare upload bandwidth is available for uploading (box 320). A selection then is made as to which rate allocation technique to use (box 330). If the utility function optimization technique is selected, then the method determines the rate allocation by optimizing a utility function (box 340). The details of this technique are discussed below. If the minimum cost flow formulation technique is selected, then the method determines the rate allocation using a minimum cost flow formulation (box 350). The method then outputs an optimal rate allocation (box 360).

III. Operational Details

The operational details of embodiments of the ISP-friendly rate allocation system 100 and method now will be discussed. These embodiments include embodiments of the program modules shown in FIG. 1. The operational details of each of these programs modules as well as the two rate allocation techniques mentioned above now will be discussed.

III.A. Utility Function Optimization Module

As mentioned above, the utility function optimization module 140 uses a utility function optimization technique. This technique is used to determine the rate allocation by optimizing a utility function. An overview of this utility function optimization technique first will be discussed, followed by a detailed explanation of the technique.

Figure 4:
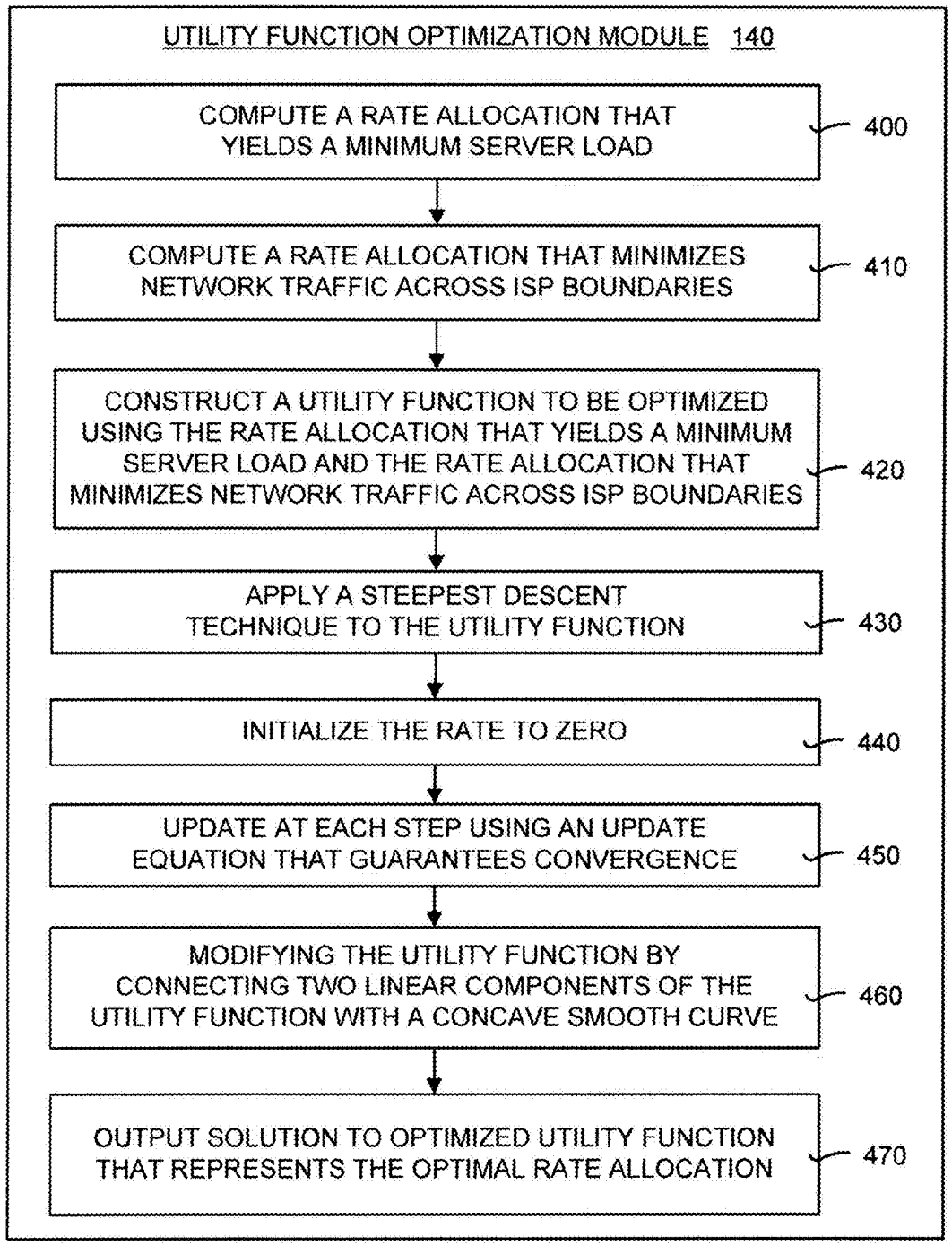
FIG. 4 is a flow diagram illustrating the detailed operation of embodiments of the utility function optimization module shown in FIG. 1.

FIG. 4 is a flow diagram illustrating the detailed operation of embodiments of the utility function optimization module 140 shown in FIG. 1. The operation of the module 140 begins by computing a rate allocation that yields a minimum server load (box 400). Next, the module 140 computes a rate allocation that minimizes network traffic across ISP boundaries (box 410). These computations are described in detail below.

The module 140 then constructs a utility function to be optimized using a rate allocation that yields a minimum server load and the rate allocation that minimizes network traffic across ISP boundaries (box 420). A steepest descent technique then is applied to the utility function (box 430). This is performed by initializing the rate to zero (box 440) and then updating at each step using an update equation that guarantees convergence (box 450). This is explained in detail below.

Figure 5:
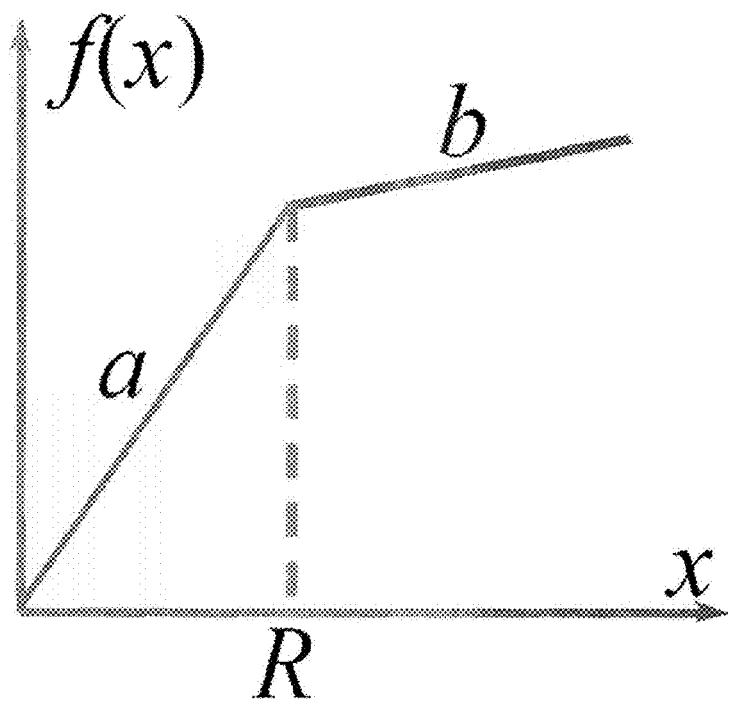
FIG. 5 is a block diagram illustrating an exemplary embodiment of a single utility function used by embodiments of the ISP-friendly rate allocation system and method shown in FIG. 1.

As also explained below, the module 140 modifies the utility function. More specifically, the original utility function is modified by connecting two linear components of the utility function with a concave smooth curve (box 460). The original utility function is shown in FIG. 5 and the modified utility function is shown qualitatively in FIG. 6. The module 140 then outputs a solution to the optimized utility function that represents the optimal rate allocation (box 470). Each of these steps is described in detail as follows.

III.A.1. Brief Primer

By way of example, assume there are n peers in the system at any instant of time. Denote them as Peer k (k=1, 2, ..., n), ordered by their arrival time. When Peer j arrives, it connects to a subset of peers already in the system (say including Peer i) and requests data from them. The rate $x_{i,j}$ is the rate Peer i allocates from its upload capacity $U_i$ to serve Peer j. Each peer keeps track of its total upload capacity, which can initially be estimated based on historical values and then measured and updated once data starts to flow to its neighbors. Denote $S_j$ as the set of all peers uploading to Peer j (Peer j's upstream neighbors). Denote $D_i$ as the set of all peers downloading from Peer i (Peer i's downstream neighbors). The aggregate rate Peer j receives from all of its upstream neighbors is denoted as:

$$x_j = \Sigma_{i \in S_j} x_{i,j}.$$

Denote $R_j$ as the desirable streaming rate of Peer j in order to maintain smooth video playback. In general, $R_j$ could vary based on the amount of content in its local cache. For simplicity, however, let all $R_j$'s be the same for now, equal to the video bitrate R. In this case, smooth video playback requires $x_j \geq R$. Hence, if $x_j < R$, then Peer i will request data from the server at rate $R-x_j$ to make up for the deficit. If $x_j > R$, on the other hand, Peer j will download data faster than real-time and cache for future. This is called "prefetching." Prefetching combats peer churn, bandwidth jitter, and so forth. The ability to prefetch is one of the key differentiations between video on demand (VoD) and live streaming. The aggregate rate at which Peer i uploads to all its downstream neighbors is:

$$\Sigma_{j \in D_i} x_{i,j}.$$

Clearly, this cannot exceed Peer is upload bandwidth, represented as, $$\Sigma_{j \in D_i} x_{i,j} \leq U_i.$$

Furthermore, for unified representation, Peer 0 is denoted as a special peer, a peer that represents the server. Then, $x_{0,j}$ is the rate Peer j obtained from the server, which satisfies $x_{0,j} = \max(0, R-x_j)$.

In this document, the following assumptions are made for purposes of the analysis. First it is assumed that peers cache all the content they watch and keep them until they leave the system. Second, it is assumed that peers only upload to their downstream neighbors, and not vice versa. Finally, it is assumed that peers have more content than their downstream neighbors and thus are able to upload as fast as needed.

III.A.2. The 3-Stage Optimization Process

The details of embodiments of the utility function optimization module 140 now will be described. This system and method achieve each of the aforementioned objectives through a 3-stage optimization process.

III.A.2.i. First Stage: Minimize Server Load

The first stage of embodiments of the utility function optimization module 140 minimizes the server load. This can be realized as follows:

$$\min \sum_j x_{0,j} \tag{1}$$

$$\text{s.t.} \sum_{i \in \{0, D_j\}} x_{i,j} = R, \tag{2}$$

$$\sum_{j \in D_i} x_{i,j} \leq U_i, \tag{3}$$

$$x_{i,j} \geq 0 \forall i, j (i, j \neq 0). \tag{4}$$

After the optimization, the minimum server load can then be computed as, $$U_0^{min} = \Sigma_j x^*_{0,j},$$

where $$\{x^*_{0,j}\}_{j=1}^n$$

is an optimal solution.

III.A.2.ii Second Stage: Minimize ISP-Unfriendly Traffic

The second stage of embodiments of the utility function optimization module 140 seeks to limit the upload capacity of the server to $U_0^{min}$ from the first stage. Next, a link cost is associated with ISP-unfriendly traffic. Denote $g_{i,j}(x_{i,j})$ as the cost for Peer i to upload to Peer j at rate $x_{i,j}$. The link cost can take forms as simple as the sign function, where the cost is 0 for intra-ISP and 1 for inter-ISP traffic. However, the link cost could also be generalized to incorporate various levels of cost. By way of example, these levels could include using different costs to differentiate intra-POP and inter-POP traffic within the same ISP.

The rate allocation can be represented as follows:

$$\min \sum_{i,j} g_{i,j}(x_{i,j}) \tag{5}$$

s.t. (2), (3), (4) and $$\sum_j x_{0,j} \leq U_0^{min} \text{(from 1st-stage)}. \tag{6}$$

After the optimization the minimum ISP-unfriendly traffic can be computed as, $$G^{min} = \Sigma_{i,j} g_{i,j}(x^*_{i,j}).$$

III.A.2.iii. Third Stage: Maximize Peer Prefetching

The third stage of embodiments of the utility function optimization module 140 seeks to allow peers download more than their demand. Peer prefetching then can be maximized when all peers fully utilize their upload capacity. Hence, this objective is translated into minimizing the remaining of peers' upload capacity. The first two objectives will not be affected, as long the minimum server load and ISP-unfriendly traffic is limited to $U_0^{min}$ and $G^{min}$, respectively. In this case, the rate allocation is as follows:

$$\min \sum_i \left( U_i - \sum_j x_{i,j} \right) \tag{7}$$

s.t. (3), (4), (6) and $$\sum_{i \in \{0, D_j\}} x_{i,j} \geq R \text{ (download could exceed demand)}. \tag{8}$$

$$\sum_{i,j} g_{i,j}(x_{i,j}) \leq G^{min} \text{(from 2nd-stage)}. \tag{9}$$

III.A.2.iv. Unifying the Three Stages

The 3-stage optimization then is unified into a single optimization, as follows:

$$\min \alpha \sum_j x_{0,j} + \beta \sum_{i,j} g_{i,j}(x_{i,j}) + \gamma \sum_j \left( U_x - \sum_j x_{i,j} \right) \tag{10}$$

$$\text{s.t.} \sum_{i \in \{0, D_j\}} x_{i,j} \geq R, \sum_{j \in D_i} x_{i,j} \leq U_i, x_{i,j} \geq 0 \forall i, j (i, j \neq 0).$$

It can be shows that, if $\alpha \gg \beta \gg \gamma$, then the solution to Equation (10) will be equivalent to the 3-stage optimization. Both optimizations can be carried out with the existence of a central oracle, but becomes more difficult if all peers strike distributedly and independently.

III.A.3. Utility-Based Optimization

Embodiments of the utility function optimization module 140 next introduce an artificial utility function. This function not only bears an intuitive meaning, but can also directly translate the centralized optimization into a utility-based optimization, from which a completely distributed solution is merited.

III.A.3.i. Single Utility Function

Embodiments of the utility function optimization module 140 use a utility function for each peer in terms of the aggregate rate received from all its upstream neighbors (excluding the server or Peer 0). This utility function can be represented as:

$$f(x_j) = \begin{cases} a \cdot x_j & \text{if } x_j \leq R \\ a \cdot R + b \cdot (x_j - R) & \text{if } x_j > R \end{cases} \quad (11)$$

where a, b are positive constants and a>b.

FIG. 5 is a block diagram illustrating an exemplary embodiment of a single utility function, f(x), used by embodiments of the ISP-friendly rate allocation system and method shown in FIG. 1. Note that a represents the first positive constant and b represents the second positive constant. At the intersection where the first positive constant a and the second positive constant b meet is the streaming rate R.

Here, a represents the value of getting rate from other peers up to streaming rate R. This means that for every unit of rate from other peers increases the utility by a. Also, a can be interpreted as the cost of server bandwidth. For example, in a peer-assisted VoD session, the server has to supplement all the rate peers cannot obtain from each other. At the same time, each peer has to maintain receiving data at least at streaming rate R. Hence, up to streaming rate R, every unit of bandwidth that a peer is able to obtain from other peers is a unit of bandwidth the server can save.

A strictly positive b represents the value of prefetching. This is a major difference between live streaming and VoD streaming. In live streaming, peers have roughly synchronous playback times. This means that peers cannot buffer up much ahead of time and there can be very little prefetching (in other words, b=0). In VoD, however, a peer's playback time can be sufficiently far apart and there is great value for a peer to buffer up when possible to save for future use.

As a matter of fact, the piece-wise linear utility function ensures that, when the total utility is maximized, the server load is minimized. In addition, peer prefetching is maximized simultaneously.

Proposition 1: The solutions to, $$\max_{x_{i,j}} \sum_j f(x_j) \quad (12)$$

$$\text{s.t.} \sum_{j \in D_i} x_{i,j} \leq U_i, \; x_{i,j} \geq 0 \; \forall \; i, j,$$

minimize server load and maximize peer prefetching.

Proof sketch: Minimizing server bandwidth can be described as the following optimization problem:

$$\min_{x_{i,j}} \sum_j a \cdot \max(0, R - x_j) \quad (13)$$

-continued $$\text{s.t.} \sum_{j \in D_i} x_{i,j} \leq U_i, \; x_{i,j} \geq 0 \; \forall \; i, j,$$

since a is a positive constant.

This is equivalent to, $$\max_{x_{i,j}} \sum_j a \cdot \min(x_j, R) \quad (14)$$

$$\text{s.t.} \sum_{j \in D_i} x_{i,j} \leq U_i, \; x_{i,j} \geq 0 \; \forall \; i, j.$$

The utility function given in Equation (11) can be rewritten as, $$f(x_j) = a \cdot \min(R, x_j) + b \cdot \max(0, x_j - R) = b \cdot x_j + (a-b) \cdot \min(R, x_j) \quad (15)$$

Each of the solutions to Equation (12) using the proposed utility function given in Equation (11) must satisfy, $$\Sigma_{j \in D_i} x_{i,j} = U_i$$

in order to maximize peer prefetching. This can be shown through contradiction. Hence, Equation (12) is equivalent to, $$\max_{x_{i,j}} \sum_j b \cdot U_j + \sum_j (a-b) \cdot \min(R, x_j) \quad (16)$$

$$\text{s.t.} \sum_{j \in D_i} x_{i,j} = U_i, \; x_{i,j} \geq 0 \; \forall \; i, j.$$

The term $\Sigma_j b \cdot U_j$ is a constant and a−b>0. This means that Equation (16) is equivalent to, $$\max_{x_{i,j}} \sum_j a \cdot \min(x_j, R) \quad (17)$$

$$\text{s.t.} \sum_{j \in D_i} x_{i,j} = U_i, \; x_{i,j} \geq 0 \; \forall \; i, j.$$

The only difference between Equations (14) and (17) is the constraint on, $$\Sigma_{j \in D_i} x_{i,j}, \; \min(x_j, R) = \min(\Sigma_{i \in S_j} x_{i,j}, R)$$

is nondecreasing in, $$x_{i,j}, \; \forall i,j.$$

Thus, the solutions to Equation (17) are a subset of those to Equation (14). In summary, the solutions to Equation (12) are a subset of those to of Equation (14) and minimize server load and maximize peer prefetching. This concludes the sketch of the proof of the above proposition.

The connection between the utility optimization given in Equation (12) and the unified 3-stage optimization given in Equation (10) now will be explained. In fact, ISP-unfriendly link cost aside (or letting $g_{i,j}(x_{i,j})=0$), it is not difficult to show that these two optimizations are equivalent and, in addition, shown that a=α and b=γ. Compared to the unified 3-stage optimization given in Equation (10), the utility function introduced here bears a much more intuitive meaning. In fact, it is straightforward to see that with the piece-wise utility function, a peer would not help a neighbor prefetch if it could instead use the upload bandwidth to satisfy other neighbors' basic streaming demand first. Hence, minimizing server load will have a higher priority than prefetching.

III.A.3.ii. Costs on ISP-Unfriendly Traffic

Recall that in order to reduce ISP-unfriendly traffic, embodiments of the utility function optimization module 140 associate a link cost with ISP-unfriendly traffic. In other words, the cost for Peer i to upload to Peer j at rate $x_{i,j}$ is $g_{i,j}(x_{i,j})$. The overall utility optimization problem then becomes, $$\max_{x_{i,j}} \sum_{1 \leq j \leq n} \left( f(x_j) - \sum_{i \in S_j} g_{i,j}(x_{i,j}) \right) \quad (18)$$

$$\text{s.t.} \sum_{j \in D_i} x_{i,j} \leq U_i, x_{i,j} \geq 0 \,\forall\, i,j.$$

A natural choice for $$g_{i,j}(\bullet) \text{ is } g_{i,j}(x_{i,j})=c_{i,j} \cdot x_{i,j},$$

where $c_{i,j}$ is a positive constant that represents the cost of getting each unit of rate from Peer i to Peer j. When positive costs are used for various ISP-unfriendly traffic, it is intuitive that the maximization in Equation (18) will reduce undesirable traffic. However, this is potentially at the cost of increasing server load. The relationship among $c_{i,j}$, a and b controls the tradeoff between the server load and the ISP-friendliness. To better understand this, consider a simple case where $c_{i,j}=0$ if Peer i and Peer j are within the same ISP, and $c_{i,j}=c>0$ otherwise.

Proposition 2: Compared to solutions for Equation (12), solutions to Equation (18) may have higher server rates. For each additional unit of server rate used due to incorporating ISP friendliness, there is at least a reduction of (a−b)/c units of ISP-unfriendly traffic.

Proof sketch: Among all the ISP-unaware solutions that minimize server load, a subset of them requires the least ISP-unfriendly traffic. Let $\{\bar{x}_{i,j}\}$ be one of these solutions. Let $\{\tilde{x}_{i,j}\}$ be a solution for Equation (18). Then by definition, $$\sum_{1 \leq j \leq n} \left( f(\bar{x}_j) - \sum_{i \in S_j} g_{i,j}(\bar{x}_{i,j}) \right) \leq \sum_{1 \leq j \leq n} \left( f(\tilde{x}_j) - \sum_{i \in S_j} g_{i,j}(\tilde{x}_{i,j}) \right) \Rightarrow$$

$$\sum_{1 \leq j \leq n} (f(\bar{x}_j) - f(\tilde{x}_j)) \leq \sum_{1 \leq j \leq n} \left( \sum_{i \in S_j} (g_{i,j}(\bar{x}_{i,j}) - g_{i,j}(\tilde{x}_{i,j})) \right)$$

Using Equation (15), $$LHS = \left( b \sum_j \bar{x}_j + (a-b) \cdot \min(R, \bar{x}_j) \right) - \left( b \sum_j \tilde{x}_j + (a-b) \cdot \min(R, \tilde{x}_j) \right)$$

$$= b \cdot \left( \sum_j \bar{x}_j - \sum_j \tilde{x}_j \right) + (a-b) \cdot (\min(R, \bar{x}_j) - \min(R, \tilde{x}_j)).$$

As stated earlier, $$\Sigma_j \bar{x}_j = \Sigma_j U_j,$$

and thus, $$\Sigma_j \bar{x}_j \geq \Sigma_j \tilde{x}_j.$$

The term, $$\min(R, \bar{x}_j) - \min(R, \tilde{x}_j)$$

is the increase in server load due to incorporating ISP-friendliness. Thus, $$LHS \geq (a-b) \cdot (\text{additional server load})$$

due to incorporating ISP-friendliness. In addition, $$RHS = c \cdot \sum_{1 \leq j \leq n} \left( \sum_{\substack{i \in S_j \\ i \notin I_j}} \bar{x}_{ij} \right) - c \cdot \sum_{1 \leq j \leq n} \left( \sum_{\substack{i \in S_j \\ i \notin I_j}} \tilde{x}_{ij} \right) \quad (20)$$

where $I_j$ denotes the subset of Peer j's neighbors in the same ISP as Peer j.

Here, $$\sum_{1 \leq j \leq n} \left( \sum_{\substack{i \in S_j \\ i \notin I_j}} x_{i,j} \right)$$

is nothing but the total ISP-unfriendly rate using allocation $\{x_{i,j}\}$. Hence, $$RHS = c \cdot (\text{saving in ISP-unfriendly rate}). \quad (21)$$

Combining Equation (19) and Equation (21) yields, $$\text{saving in ISP-unfriendly rate} \geq \frac{a-b}{c} (\text{additional server load}). \quad (22)$$

Intuitively, setting a≪c will result in a pure ISP-friendly solution that eliminates ISP-unfriendly traffic completely. On the other hand, setting b≫c will result in full utilization of a peer's upload bandwidth at all times.

III.A.4. Distributed Solution

Now that the rate allocation problem has been formulated as a convex optimization problem with linear constraints, it is straightforward to apply classical distributed solutions. In particular, some embodiments of the utility function optimization module 140 adopt the feasible steepest descent algorithm. This means that $x_{i,j}$ is first initialized to 0 and then updated at each step using the update equation given as:

$$\dot{x}_{i,j} = \Delta \cdot \left( \frac{\partial}{\partial x_{i,j}} f(x_j) - \frac{\partial}{\partial x_{i,j}} g_{i,j}(x_{i,j}) \right), \quad (23)$$

$$x_{i,j} = [x_{i,j} + \dot{x}_{i,j}]^+$$

where $[\bullet]^+$ means an $l_2$ projection onto a feasible set, which guarantees convergence for this problem given in Equation [10].

By way of example, due to the simple symmetric linear constraints, this step can be easily implemented as given by the following pseudo-code:

$$\text{while } \left( \sum x_{i,j} > U_i \right)$$

$$\left\{ N_i = \text{number of neighbors with } x_{i,j} > 0 \right.$$

-continued foreach(j)

if$(x_{i,j} > 0)$ $x_{i,j} = x_{i,j} - \min\left(x_{i,j} \cdot \frac{U_i - \sum x_{i,j}}{N_i}\right);$ }.

Note that in order for Peer i to carry out the update step, the only external information required is the aggregate received bandwidth at Peer j. This information can be easily piggybacked in Peer j's packet requests.

III.A.5. Practical Considerations

The piece-wise linear utility function f(•) and linear link cost functions $g_{i,j}$(•) have shortcomings in practice. First, f(•) has a sudden slope change at exactly video rate R. This causes unsteady convergence behavior and, more importantly, eliminates ISP-unfriendly prefetching completely. As a matter of fact, moderate prefetching is beneficial in reducing the server load and improving a peer's uplink utilization in the long run, especially in the presence of peer churning, bandwidth jitter or flash crowd (when a neighboring peer's playback points are very close to each other).

Figure 6:
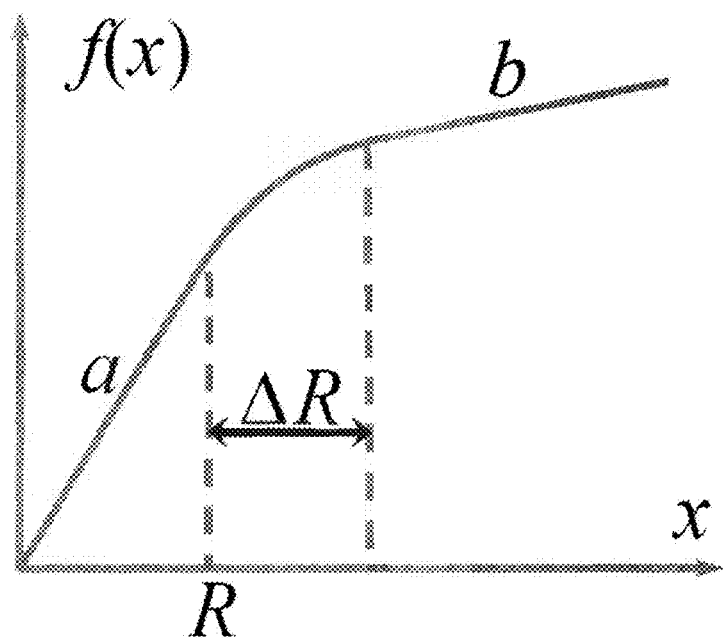
FIG. 6 is a block diagram illustrating an exemplary embodiment of a modified utility function used by embodiments of the ISP-friendly rate allocation system and method shown in FIG. 1.

Thus, in some embodiments of the utility function optimization module 140, f(•) is modified slightly by connecting the two linear components with a concave smooth curve of width ΔR. FIG. 6 is a block diagram illustrating an exemplary embodiment of a modified utility function used by embodiments of the ISP-friendly rate allocation system and method shown in FIG. 1.

The implication is that moderate ISP-unfriendly prefetching is potentially allowed, but bound the amount by ΔR per peer in the worst case. Some embodiments use ΔR=0.1 R and a Deg. 3 polynomial for the curve. Next, some embodiments change the link cost function g(•) from linear to a flat quadratic one such that the optimization is strictly concave. This allows faster and steadier convergence. The link cost function g(•) is set such that, $$\frac{d}{dx} g(x) = c + \varepsilon x \text{ with } \varepsilon \ll \frac{c}{R}.$$

Note that in these embodiments, by making above modifications, the final solution will deviate from the optimal solution directly derived from Equation (10).

Additionally, to take a peer's evolving buffer level into consideration, peers also convert their buffer level into an equivalent received rate. Some embodiments of the P2P rate allocation system and method use a simple linear conversion where the aggregate received rate is incremented by, $$\frac{\text{buffer level}}{\text{buffer length}} \cdot R.$$

For instance, suppose Peer j's buffer can hold 160 packets. Then if Peer j has 40 packets in the buffer, it will consider its aggregate received rate to be, $$\frac{1}{4} R + \sum_{i \in S_j} x_{i,j}.$$

III.B Minimum Cost Flow Formulation Module

As mentioned above, the minimum cost flow formulation module 150 uses a minimum cost flow formulation technique. This technique is used to determine the rate allocation by minimizing a cost flow formulation. An overview of this minimum cost flow formulation technique first will be discussed, followed by a detailed explanation of the technique.

Figure 7:
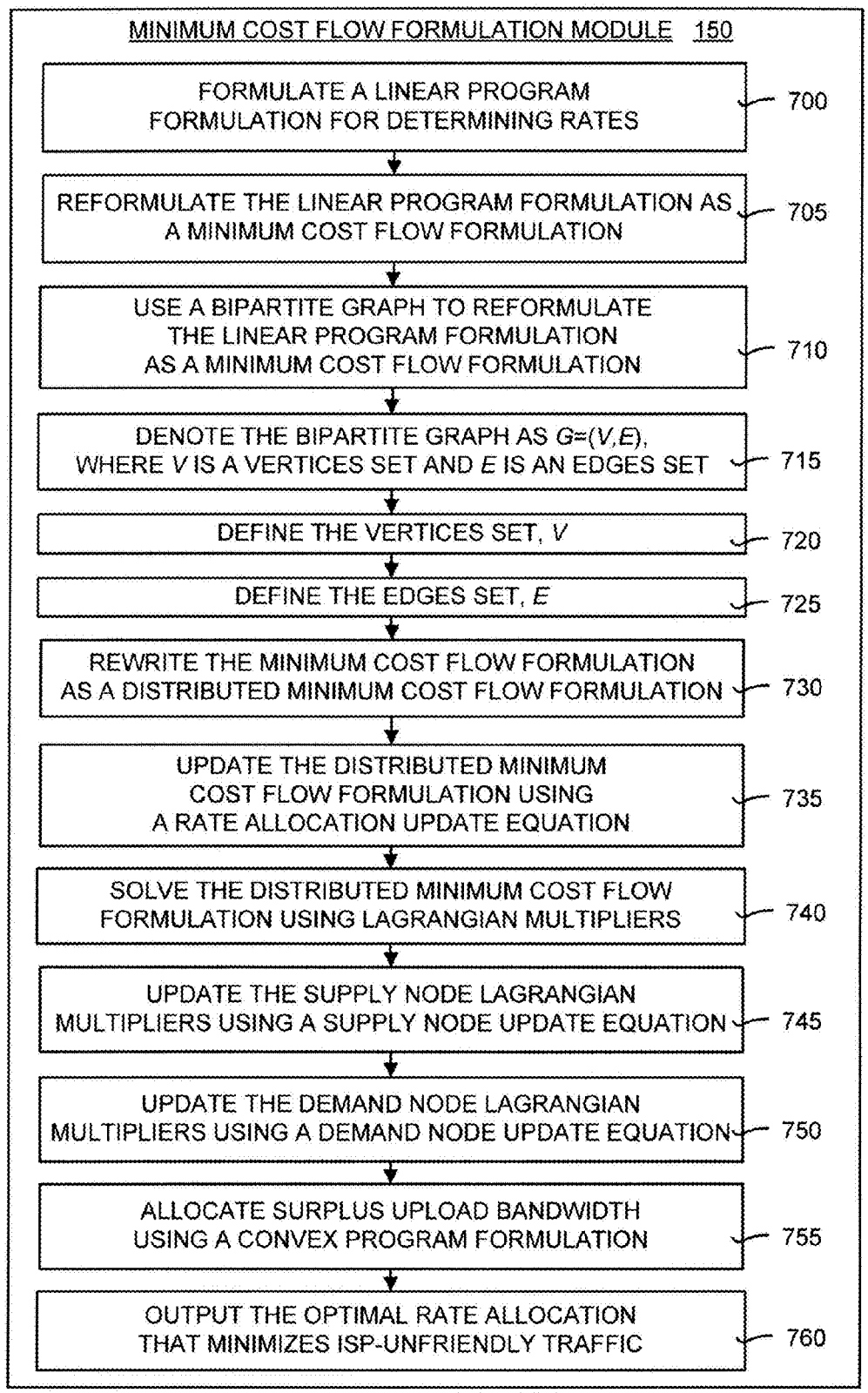
FIG. 7 is a flow diagram illustrating the detailed operation of embodiments of the minimum cost flow formulation module shown in FIG. 1.

FIG. 7 is a flow diagram illustrating the detailed operation of embodiments of the minimum cost flow formulation module 150 shown in FIG. 1. The operation of the module 150 begins by formulating a linear program formulation for determining rates (box 700). Next, the module 150 reformulates the linear program formulation as a minimum cost flow formulation (box 705).

In some embodiments of the minimum cost flow formulation module 150 a bipartite graph is used to reformulate the linear program formulation as a minimum cost flow formulation (box 710). As explained in detail below, the bipartite graph is denoted as G=(V, E), where V is a vertices set and E is an edges set (box 715). Next, the module 150 defines the vertices set V (box 720) and also defines the edges set E (box 725).

The module 150 then rewrites the minimum cost flow formulation in distributed form as a distributed minimum cost flow formulation (box 730). The distributed minimum cost flow formulation is updated using a rate allocation update equation (box 735). The distributed minimum cost flow formulation then is solved using Lagrangian multipliers (box 740). Solving involves updating the supply node Lagrangian multipliers using a supply node update equation (box 745) and updating the demand node Lagrangian multipliers using a demand node update equation (box 750). The module 150 also allocates surplus upload bandwidth using a convex program formulation (box 755). The module 150 then outputs an optimal rate allocation that minimizes ISP-unfriendly traffic (box 760). Each of these steps is described in detail as follows.

III.B.1 Notation

Peers are labeled in increasing order of arrival time as {1; 2; : : : ; n}. Server has label of 0. Let $x_{i,j}$ denote the rate from Peer i to Peer j (0≤i≤j<n), Let $U_i$ be the uplink constraint of Peer i. The available server uplink capacity is given by $U_0$. Let a be the associated cost of inter-ISP traffic and let β be the cost of serving traffic from the origin server. Let $R_i$ denote the desired download rate of Peer i. This could vary with time as a function of the buffered amount of video.

IIII.B.2. Linear Programming Formulation

The linear programming formulation for determining the rates $x_{i,j}$ is given by:

$$\text{minimize} \sum_i \beta x_{0i} + \sum_{i,j \text{ cross } ISP} \alpha x_{i,j}$$

subject to $$\sum_{j>i} x_{ij} \le U_i \; \forall \; 0 \le i \le n.$$

III.B.3. Minimum Cost Flow Formulation

The above linear program can be formulated as a minimum cost flow problem as follows. First, construct a bipartite graph G=(V,E) where vertices, $$V = V_1 \cup V_2$$

are given by:

$$V_1 = \{v_0, v_1 \ldots v_n\}$$

$$V_2 = \{v'_1, v'_2 \ldots v'_n, v'_{n+1}\}.$$

Each $v_i$ node has a supply of $U_i$ that denotes the uplink capacity of Peer i (i>0) or server i (i=0). Each $v'_j$ node has a demand of $R_j$ that denotes the desired download rate of Peer i. The super-sink node $v'_{n+1}$ in $V_2$ is added to model the unused uplink capacity of all peers-node $v'_{n+1}$ has a demand of $$\left(\sum_{i=0}^{n} U_i - \sum_{j=1}^{n} R_j\right).$$

Imagine that unused uplink capacity of all peers is used to send flow to the super-sink node $v'_{n+1}$. With this, the total supply of nodes in $V_1$ equals the total demand of nodes in $V_2$.

The edge set E is given by the following:
1. Edges $(v_i, v'_j)$ for all $0 \leq i \leq j \leq n$, denoting data transfer from Peer i (or, Server for i=0) to Peer j.
2. Edges $(v_i, v'_{n+1})$ for all $0 \leq i \leq n$, denoting unused uplink capacity of Peer i (or, Server for i=0).

Figure 8:
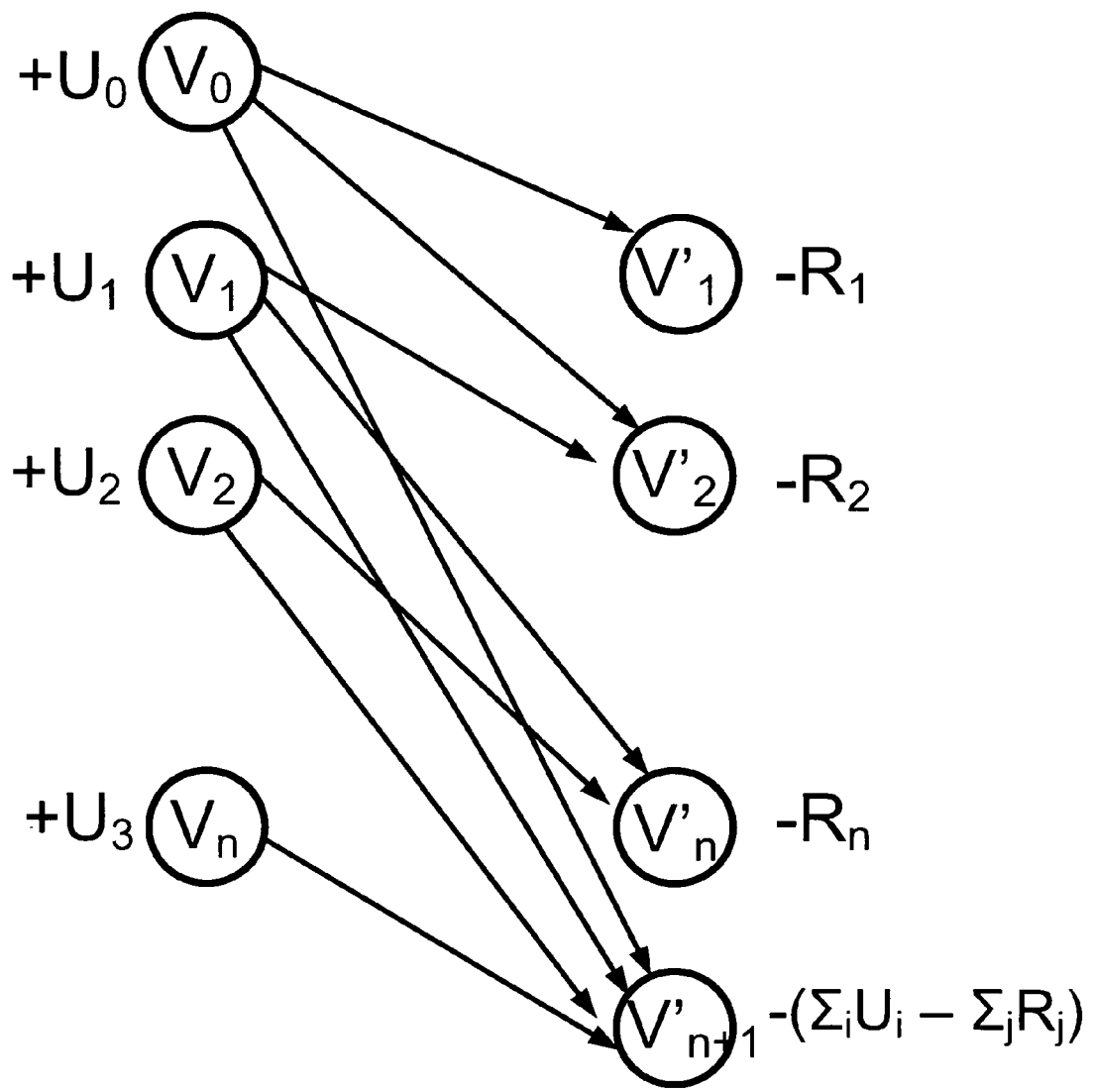
FIG. 8 is a block diagram illustrating an exemplary embodiment of a bipartite graph used by embodiments of the ISP-friendly rate allocation system and method shown in FIG. 1.

FIG. 8 is a block diagram illustrating an exemplary embodiment of a bipartite graph used by embodiments of the ISP-friendly rate allocation system and method shown in FIG. 1. As shown in FIG. 8, edges $(v_i, v'_j)$ $(0 \leq i < j \leq n)$ have cost=$-\alpha$ if i, j are within same ISP. Otherwise, the cost=$-1$. Edges $(v_1, v'n+1)$ have cost=0. Note that any linear objective function can be modeled here. The term $c_{i,j}$ is used to denote the cost of the link $(v_i, v'_j)$ and the corresponding rate (flow) by $x_{i,j}$.

This is a variation of the transportation problem that is a special case of the minimum cost network flow problem. As set forth below, a distributed algorithm is developed to address this problem.

III.B.4. Distributed Algorithm

The linear program can be rewritten using the minimum cost flow formulation as:

$$\text{minimize} \sum_{i<j} c_{ij} x_{ij}$$

subject to, $$\sum_{j>i} x_{ij} = U_i \forall\ 0 \leq i \leq n$$

$$\sum_{i<j} x_{ij} = \begin{cases} R_i & \text{if } 1 \leq i \leq n \\ \sum_{i=0}^{n} U_i - \sum_{i=1}^{n} R_i & \text{if } i = n+1 \end{cases}$$

Let m denote the number of variables $x_{i,j}$. In other words, m denotes the number of edges in the bipartite graph G. The above constraints can be written in compact notation as Ax=b, where A is the (2n+2)×m matrix containing 0's and 1's corresponding to the LHS of the constraints, column vector $x=\{x_{i,j}\}$, and column vector $b=(U_0, U_1 \ldots U_n, D_1, D_2, \ldots, D_{n+1})$ where $$D_j = \begin{cases} R_j & \text{if } 1 \leq j \leq n \\ \sum_{i=0}^{n} U_i - \sum_{i=1}^{n} R_i & \text{if } j = n+1 \end{cases}$$

The linear program now becomes minimize$\Sigma_{i<j} c_{i,j} x_{i,j}$ subject to Ax=b, III.B.4.i Augmented Lagrangian Technique Embodiments of the minimum cost flow formulation module 150 use an augmented Lagrangian technique to solve the equivalent problem below for some parameter $\alpha>0$. This problem can be represented as, minimize$\Sigma_{i<j} c_{i,j} x_{i,j} + 1;2a\|Ax-b\|^2$ subject to Ax=b Lagrangian multipliers are introduced and given by the column vector p for the constraints Ax=b. The augmented Lagrangian function is given by, $$L_a(x, p) = \sum_{i<j} c_{ij} x_{ij} + p^T(Ax - b) + \frac{1}{2} a\|Ax - b\|^2$$

The Lagrangian sub-problem is given by, minimize$_x L_a(x,p)$.

Embodiments of the minimum cost flow formulation module 150 next solve the Lagrangian sub-problem including the Gauss-Siedel method for quadratic programming. The solution will define the values of the $x_{i,j}$ variables in next time step and will be denoted by x(t+1). The values of the Lagrangian multipliers p then are given by, $p(t+1)=p(t)+a(t)[Ax(t+1)-b]$ Lagrangian multipliers p next are divided into two groups: (i) $s_i$, $0 \leq i \leq n$ corresponding to supply nodes, and (ii) $d_j$, $1 \leq j \leq n+1$ corresponding to demand nodes in the bipartite graph. Then, the update step for the Lagrangian multipliers becomes, $$s_i(t+1) = s_i(t) - a(t)\left[U_i - \sum_{k>i} x_{ik}(t+1)\right], \quad (24)$$

which is the supply node update equation, and $$d_j(t+1) = d_j(t) - a(t)\left[D_j - \sum_{k<j} x_{kj}(t+1)\right], \quad (25)$$

which is the demand node update equation. Here, any non-decreasing sequence of positive numbers can be used for a(t).

III.B.4.ii. Solving the Lagrangian Sub-Problem

After algebraic simplification, the augmented Lagrangian function can be written as, $$L_a(x, p) = \frac{1}{2} a x^T A^T A x + (c + A^T p - a A^T b)x.$$

The standard form of the quadratic program for applying Gauss-Siedel method is, minimize$_n \frac{1}{2} u^T P u + r^T u$ where $P = A' Q^{-1} A'^T, r = c' - A' Q^{-1} b'.$ Casting this to the form of the Lagrangian sub-problem that is to be solved yields, $A'=A^T$, Q=aT, $r=c+A^T(p-ab)$ Let column vector $a'_j$ be the j-th column of $A'^T$, and let column vector $w_j$ be the j-th row of $A'Q^{-1}$. Then, the solution of the above (standard form) quadratic program is given by, $$u_j = \left[u_j - \frac{1}{u'^T_j a'_j}(r_j - w^T_j y)\right]^+,$$

where $y=-A-^T u$.

Note that the matrix A contains exactly two 1's in each column. Using this structure of matrix A, the above equation can be simplified to obtain the update step for the original $x_{i,j}$ variables as follows, $$x_{ij}(t+1) = x_{ij}(t) - \frac{1}{2a(t)}[c_{ij} + s_i(t) + d_j(t)] + \frac{1}{2}\left[U_i - \sum_{k>i} x_{ik}(t)\right] + \frac{1}{2}\left[D_j - \sum_{k<j} x_{kj}(t)\right].$$

Since $0 \leq x_{i,j} \leq \min(U_i, D_j)$, the $x_{i,j}$ value obtained at every step using the above equation needs to be projected to the interval $[0; \min(U_i, D_j)]$.

III.B.4.iii. Putting it All Together

Equation (26) can be used to update the rates $x_{i,j}(t)$ locally, since it requires communication between nodes i and j only. The term, $$(U_i - \Sigma_{k>i} x_{ik}),$$

is the remaining unused uplink capacity of Peer i (or Server if i=0). The term, $$(D_j - \Sigma_{k<j} x_{kj}),$$

is the additional rate that Peer j desires.

Equations (24) and (25) can be used to update the Lagrangian multipliers. Each peer node owns two such variables and the update steps can be performed locally by using the value of the remaining unused uplink capacity of the peer or the value of the additional rate that the peer desires.

III.B.5. Allocating Surplus Upload Capacities

As mentioned earlier, the desired streaming rates $R_i$ for each user could vary over time as a function of the buffered size of video. If excess uplink capacity is available in the system after allocating uplink bandwidth as per the earlier formulation, then embodiments of the minimum cost flow formulation module 150 can use this to provide additional download rates top users.

There could be many ways of allocating surplus bandwidth among competing users in the system. One possible objective might be to minimize the total (remaining) time of all peers to download the remaining (respective) portions of the video or to build some desired (large) buffered video size as an insurance against variability of network conditions in the future. Let $z_i$ be the additional download rate assigned to user i and let the size of the video remaining it needs to download be $g_i$. Let $w_i$ be the surplus uplink capacity at node i (this could vary over time but is known at node i). Then, the instantaneous remaining download time of user i is given by, $$f_i(z_i) = \frac{g_i}{z_i + R_i} \forall i = 1, \ldots, n.$$

Note that the functions $f_i(z_i)$ are convex. In order to avoid increasing the objective function value defined in the earlier formulation, surplus upload capacity is allowed to be allocated only to peers within the same ISP (and thus use only intra-ISP links). This leads to the convex program formulation for allocating surplus uplink bandwidth:

$$\text{minimize} \sum_{i=1}^{n} f_i(z_i)$$

subject to $$\sum_{i<j} y_{ij} = z_j \forall 1 \leq j \leq n$$

$$\sum_{j>i} y_{ij} \leq w_i \forall 1 \leq i \leq n.$$

This convex program formulation can be solved in a distributed manner using primal, primal-dual, or dual (subgradient) methods. Note that this and the previous optimization formulations will run simultaneously in the system. As a result of being allocated surplus bandwidth over some period of time, a user's buffered video size could increase over time, thus allowing it to decrease its desired streaming rate $R_i$. This, in turn may increase the surplus upload capacity in the system available for use by the convex program formulation. Thus, there is close interaction over time between execution of the two optimization formulations through the quantities $R_i$ and $w_i$.

III.C Packet-Level Scheduling Module

Thus far, it has been assumed that the rate allocation stays at an ideal network flow level. In other words, the upload bandwidth is treated as fluid and can be divided and utilized as finely as desired. The packet-level scheduling module 160 uses a practical packet-level algorithm that conforms nicely to the flow-level one.

Figure 9:
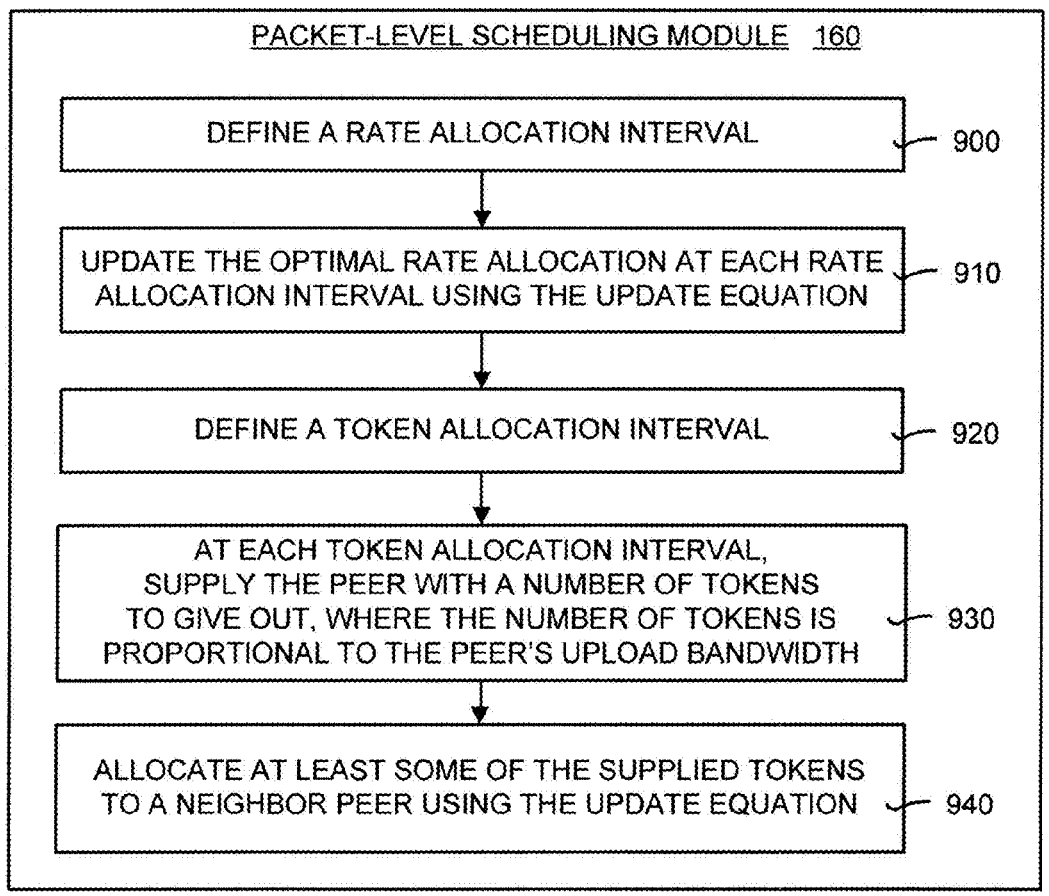
FIG. 9 is a flow diagram illustrating the detailed operation of embodiments of the packet-level scheduling module shown in FIG. 1.

FIG. 9 is a flow diagram illustrating the detailed operation of embodiments of the packet-level scheduling module 160 shown in FIG. 1. The operation of the module 160 begins by defining a rate allocation interval (box 900). Next, the optimal rate allocation is updated at each rate allocation interval using the update equation given above (box 910). A token allocation interval then is defined (box 920). At each token allocation interval, the peer is supplied with a number of tokens to give out (box 930). The number of tokens is proportional to the upload capacity of the peer. The module 160 then allocates at least some of the supplied tokens to a neighbor peer using the update equation (box 940).

III.C.1. Packet-Level Scheduling Technique

Embodiments of the packet-level scheduling module 160 use a sliding window. In particular, a sliding buffer is used for packet management. Peers maintain a buffer of interest and only download packets within the range. They slide the buffer forward every fixed interval. In some embodiments of the packet-level scheduling module 160, the fixed interval is 1 second. Peers cache all the content they have watched and make it available to their neighbor peers. In addition, peers advertise about their packet availability approximately once per second.

Embodiments of the packet-level scheduling module 160 also use packet request. More specifically, a peer ranks all the missing packets in its buffer by their importance. From each neighbor peer, the peer requests the most important packet possessed by the neighbor peer. This occurs as long as the number of pending requests at that neighbor peer is below a certain threshold. Embodiments of the packet-level scheduling module 160 determine the importance of a packet as follows.

The module 160 treats one second's worth of packets as one segment, and a segment is more important if it is closer to the playback deadline. Within a segment, the rarer a packet is in the peer's one-hop neighborhood the more important that packet. The module 160 also defines an urgency buffer, which is the first u second(s) of the buffer. The peers will simply request all the missing packets from the server. In some embodiments of the packet-level scheduling module 160, u=1. Unlike in the flow-level framework, peers are not prohibited from requesting packets from their downstream neighbors. Removing this restriction facilitates sharing among peers when their playback points are close.

Embodiments of the packet-level scheduling module 160 also use rate allocation and request response. In addition, the packet-level scheduling technique addresses how serving peers determine which neighbor peer's request to satisfy first. The module 160 uses a token system to implement the rate allocation algorithm at a packet level. A rate-allocation interval $T_{RA}$ and a token-allocation interval $T_{TA}$ are defined. Moreover, every $T_{RA}$ second, Peer i carries out rate update as in using the update equation given by Equation (23) above. The module 160 then computes the appropriate rate to allocate to each of its neighbor peers. This computation need not be synchronized among peers.

Every $T_{TA}$ second, Peer i gets a certain number of tokens to give out. It should be noted that peers need not synchronize their intervals. The number of tokens the peer obtains is proportional to its upload bandwidth. For instance, if Peer i has $U_i$ kbps upload bandwidth, it gets $U_i$ tokens each round. The peer then allocates $x_{i,j}$ tokens to neighbor Peer j as computed in the update equation given by Equation (23) above.

Note that $U_i$ and $x_{i,j}$ need not be integers. Any partial tokens will simply be left with peers for use in future rounds. In deciding which neighbor peer's request to satisfy, Peer i chooses the neighbor peer with the highest level of tokens and deducts $$\frac{\text{pocket size}}{T_{TA}}$$

tokens from the neighbor peer.

Embodiments of the packet-level scheduling module 160 also perform request rejection. Specifically, Peer i should turn down requests that it is unlikely to fulfill, so that the requester does not wait unnecessarily. For this purpose, peers include time to playback deadline in the request of each packet ($D_m$). For example, suppose a neighbor Peer j has accumulated token level $L_j$ (Peer i has this information). Peer i will turn down the request for Piece m from Peer j if by the time the packet expires, Peer j still would not have accumulated enough token. This can be represented by the equation, $$L_j + x_{i,j} \cdot \left\lfloor \frac{D_m}{T_{TA}} \right\rfloor < \frac{\text{packet size}}{T_{TA}}.$$

III.C.2. Computation Complexity and Overhead

Each iteration of the rate allocation at Peer i involves computing the update step for each of its neighbor peer j. Since the derivatives of the utility and cost functions are closed form expressions and pre-stored, this is a fairly straight forward computation with a few multiplications and additions. Each peer typically has no more than 20 neighbor peers including both upstream and downstream neighbor peers. Typically, the rate allocation is carried out once per second (such that $T_{RA}$=1 second). For personal computers having GHz processors the computation overhead is marginal.

There is almost no communication overhead involved either. This is because the only additional information that peers have to transmit to each other is: (1) their aggregate received bandwidth; and, (2) the playback deadline for each packet. Peers can piggyback this information in their packet requests with almost no overhead.

IV. Exemplary Operating Environment

Embodiments of the ISP-friendly rate allocation system 100 and method are designed to operate in a computing environment. The following discussion is intended to provide a brief, general description of a suitable computing environment in which embodiments of the ISP-friendly rate allocation system 100 and method may be implemented.

Figure 10:
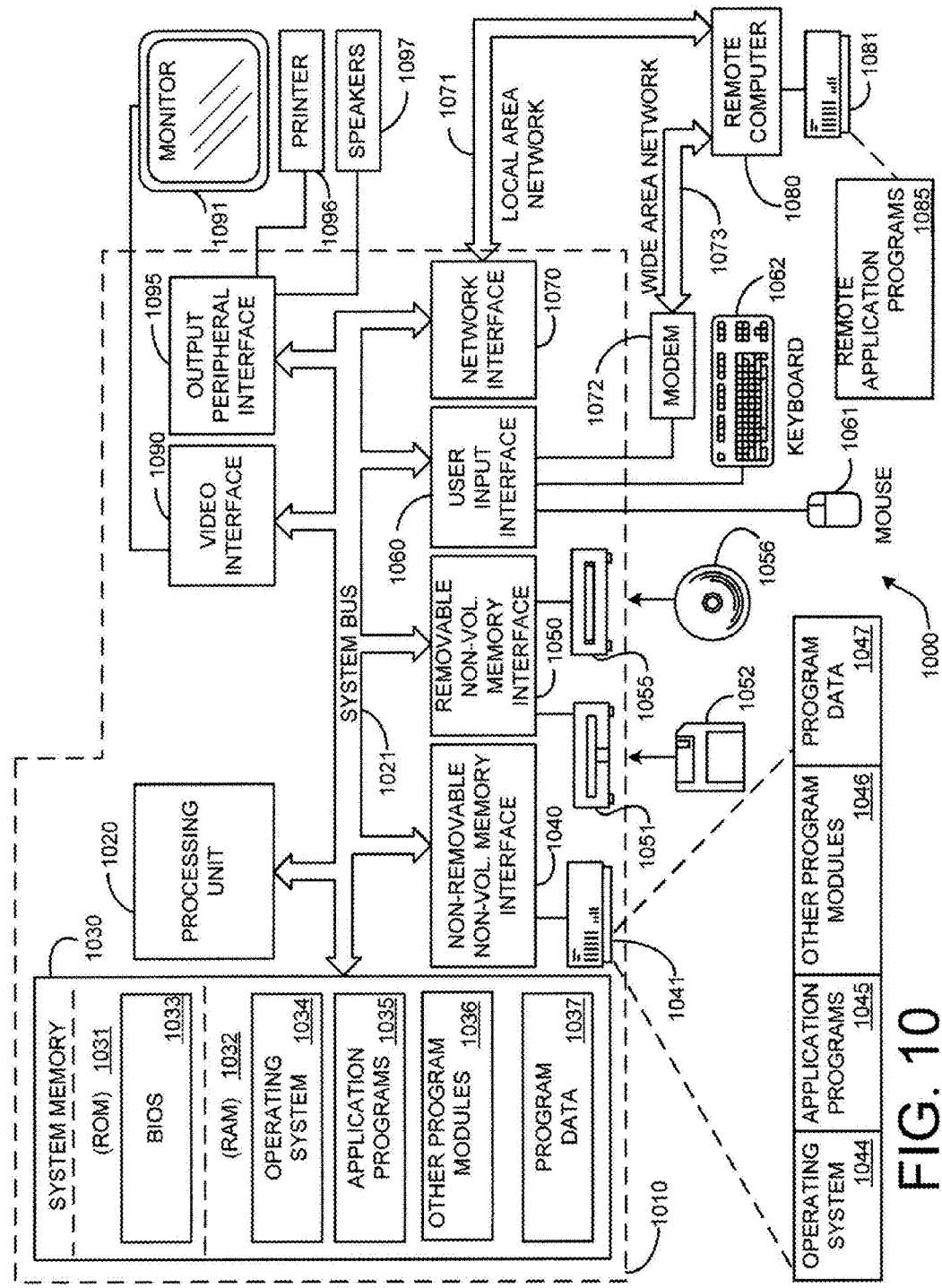
FIG. 10 illustrates an example of a suitable computing system environment in which embodiments of the ISP-friendly rate allocation system and method shown in FIGS. 1-9 may be implemented.

FIG. 10 illustrates an example of a suitable computing system environment in which embodiments of the ISP-friendly rate allocation system and method shown in FIGS. 1-9 may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment.

Embodiments of the ISP-friendly rate allocation system 100 and method are operational with numerous other general purpose or special purpose computing system environments or configurations. Examples of well known computing systems, environments, and/or configurations that may be suitable for use with embodiments of the ISP-friendly rate allocation system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the ISP-friendly rate allocation system 100 and method may be described in the general context of computer-executable instructions, such as program modules, being executed by a computer. Generally, program modules include routines, programs, objects, components, data structures, etc., that perform particular tasks or implement particular abstract data types. Embodiments of the ISP-friendly rate allocation system 100 and method may also be practiced in distributed computing environments where tasks are performed by remote processing devices that are linked through a communications network. In a distributed computing environment, program modules may be located in both local and remote computer storage media including memory storage devices. With reference to FIG. 10, an exemplary system for embodiments of the ISP-friendly rate allocation system 100 and method includes a general-purpose computing device in the form of a computer 1010. It should be noted that the computing device 110 shown in FIG. 1 is one implementation of the computer 1010.

Components of the computer 1010 may include, but are not limited to, a processing unit 1020 (such as a central processing unit, CPU), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer readable media. Computer readable media can be any available media that can be accessed by the computer 1010 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1010. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within the computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information (or data) into the computer 1010 through input devices such as a keyboard 1062, pointing device 1061, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1020 through a user input interface 1060 that is coupled to the system bus 1021, but may be connected by other interface and bus structures, such as, for example, a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 8. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for rate allocation in a peer-to-peer (P2P) network, comprising:
   determining a first rate allocation that minimizes a load on a server in communication with the P2P network to generate a minimum server load;
   determining a second rate allocation that minimizes network traffic across Internet service provider (ISP) boundaries;
   constructing a utility function using the first rate allocation and the second rate allocation; and
   optimizing the utility function to obtain an optimal rate allocation that minimizes network traffic across ISP boundaries while keeping the minimum server load unchanged.

2. The method of claim 1, further comprising:
   determining that spare upload bandwidth is available for uploading; and
   maximizing peer prefetching using the spare upload bandwidth while still minimizing network traffic across ISP boundaries and keeping the minimum server load unchanged.

3. The method of claim 1, further comprising representing the utility function to be optimized as:

$$\max_{x_{i,j}} \sum_{1 \leq j \leq n} \left( f(x_j) - \sum_{i \in S_j} g_{i,j}(x_i, j) \right) \text{ s.t.} \sum_{j \in D_i} x_{i,j} \leq U_i, x_{i,j} \geq 0 \; \forall \; i, j,$$

where $g_{i,j}(x_{i,j})$ is a cost for Peer i to upload to Peer j at a rate $x_{i,j}$, $U_i$ is an upload capacity for Peer i, and $D_i$ denotes a set of peers downloading from Peer i.

4. The method of claim 1, further comprising computing the first rate allocation using the equation:

$$U_0^{min} = \Sigma_j x^*_{0,j},$$

where, $$\{x^*_{0,j}\}_{j=1}^n$$

is an optimal solution for the first rate allocation that yields the minimum server load.

5. The method of claim 1, further comprising computing the second rate allocation using the equation:

$$G^{min} = \Sigma_{i,j} g_{i,j}(x^*_{i,j}),$$

where $g_{i,j}(x_{i,j})$ is a cost for Peer i to upload to Peer j at a rate $x_{i,j}$.

6. The method of claim 3, further comprising:
   optimizing the utility function by connecting two linear components of the utility function with a concave smooth curve;
   determining the optimal rate allocation by solving the optimized utility function.

7. The method of claim 2, further comprising determining the rate allocation using a minimum cost flow formulation.

8. The method of claim 7, further comprising:
   rewriting the minimum cost flow formulation as a distributed minimum cost flow formulation that is a distributed solution executed by each peer in the peer-to-peer network independently, while collectively achieving the optimal rate allocation; and
   using a bipartite graph in the distributed minimum cost flow formulation.

9. A method for reducing network traffic across Internet service provider (ISP) boundaries in a peer-to-peer (P2P) network, comprising:
   generating a utility function that represents a minimum load on a server in communication with the P2P network, a minimum network traffic across ISP boundaries while keeping the minimum load unchanged, and a maximum peer prefetching using spare upload bandwidth while still minimizing network traffic across ISP boundaries and keeping the minimum server load unchanged, the utility function represented as:

$$\max_{x_{i,j}} \sum_{1 \leq j \leq n} \left( f(x_j) - \sum_{i \in S_j} g_{i,j}(x_i, j) \right) \text{ s.t.} \sum_{j \in D_i} x_{i,j} \leq U_i, x_{i,j} \geq 0 \; \forall \; i, j,$$

where $g_{i,j}(x_{i,j})$ is a cost for Peer i to upload to Peer j at a rate $x_{i,j}$, $U_i$ is an upload capacity for Peer i, and $D_i$ denotes a set of peers downloading from Peer i; and
   optimizing the utility function to obtain an optimal rate allocation for the P2P network that minimizes the network traffic across ISP boundaries.

10. The method of claim 9, further comprising:
    applying a steepest descent technique to the utility function;
    initialize $x_{i,j}$ to zero; and
    update at each step using an update equation given by, $$\dot{x}_{i,j} = \Delta \cdot \left( \frac{\partial}{\partial x_{i,j}} f(x_j) - \frac{\partial}{\partial x_{i,j}} g_{i,j}(x_{i,j}) \right).$$

$$x_{i,j} = [x_{i,j} + \dot{x}_{i,j}]^+$$

where $[x_{i,j} + \dot{x}_{i,j}]^+$ denotes an $l_2$ projection on to a feasible set in order to guarantee convergence.

11. The method of claim 10, further comprising modifying $f(x_j)$ by connecting two linear components of $f(x_j)$ with a concave smooth curve of width $\Delta R$, where R is a desirable streaming rate of a peer in the P2P network.

12. The method of claim 10, further comprising:
    defining a rate-allocation interval as $T_{RA}$; and
    using Peer i to update the optimal rate allocation at every $T_{RA}$ second using the update equation to determine which neighboring peer's request to satisfy first.

13. The method of claim 12, further comprising:
    defining a token-allocation interval as $T_{TA}$;
    every $T_{TA}$ second, supplying Peer i with a number of tokens to give out such that the number of tokens is proportional to Peer i's upload bandwidth; and
    allocating $x_{i,j}$ tokens to neighbor Peer j using the update equation.

14. A method for reducing Internet service provider (ISP)-unfriendly traffic in a peer-to-peer (P2P) network, comprising:
    formulating a linear program formulation for determining rates denoted by $x_{i,j}$, where $x_{i,j}$ are rates to upload from Peer i to Peer j;
    reformulating the linear program formulation as a minimum cost flow formulation;
    rewriting the minimum cost flow formulation as a distributed minimum cost flow formulation that is a distributed solution executed by each peer in the peer-to-peer network independently, while collectively achieving an optimal rate allocation;

updating the distributed minimum cost flow formulation using a rate allocation update equation having supply node Lagrangian multipliers and demand node Lagrangian multipliers; and solving the distributed minimum cost flow formulation using the supply node Lagrangian multipliers, the demand node Lagrangian multipliers, and a computing device having a processor to obtain the optimal rate allocation that minimizes the ISP-unfriendly traffic across ISP boundaries while keeping a minimum server load that minimizes a load on a server in communication with the P2P network unchanged to obtain the optimal rate allocation.

15. The method of claim 14, further comprising using a bipartite graph to reformulate the linear program formulation as the distributed minimum cost flow formulation.

16. The method of claim 15, further comprising:
denoting the bipartite graph as $G=(V,E)$, where V is a set of vertices and E is a set of edges for the bipartite graph;
defining the vertices set V as $V=V_1 \cup V_2$ given by:

$V_1=\{v_0, v_1, \ldots, v_n\}$ and $V_2=\{v'_1, v'_2, \ldots, v'_n, v'_{n+1}\}$; and defining the edges set E as:
(a) edges $(v_i, v'_j)$ for all $0 \leq i \leq j \leq n$, which denotes a data transfer from Peer I to Peer j;
(b) edges $(v_i, v'_{n+1})$ for all $0 \leq i \leq n$, which denotes an unused upload capacity of Peer i.

17. The method of claim 16, further comprising updating the distributed minimum cost flow formulation using the rate allocation update equation as given by, $$x_{ij}(t+1) = x_{ij}(t) - \frac{1}{2a(t)}[c_{ij} + s_i(t) + d_j(t)] + \frac{1}{2}\left[U_i - \sum_{k>i} x_{ik}(t)\right] + \frac{1}{2}\left[D_j - \sum_{k<j} x_{kj}(t)\right],$$

where $c_{ij}$ is a cost of a link $(v_i, v'_j)$, $s_i(t)$ are supply node Lagrangian multipliers, and $d_j(t)$ are demand node Lagrangian multipliers.

18. The method of claim 17, further comprising:
updating the supply node Lagrangian multipliers using the update equation:

$$s_i(t+1) = s_i(t) - a(t)\left[U_i - \sum_{k>i} x_{ik}(t+1)\right]; \text{ and}$$

updating the demand node Lagrangian multipliers using the update equation:

$$d_j(t+1) = d_j(t) - a(t)\left[D_j - \sum_{k<j} x_{kj}(t+1)\right],$$

where a(t) is any non-decreasing sequence of positive numbers.

19. The method of claim 17, further comprising allocating surplus upload bandwidth using a convex program formulation given by, $$\text{minimize} \sum_{i=1}^{n} f_i(z_i),$$

subject to, $$\sum_{i<j} y_{ij} = z_j \; \forall \; 1 \leq j \leq n$$

$$\sum_{j>i} y_{ij} \leq w_i \; \forall \; 1 \leq i \leq n,$$

where $z_i$ is an additional download rate assigned to Peer i, and $w_i$ is a surplus upload capacity at Peer i.

* * * * *